United States Patent
Sakai

(10) Patent No.: US 12,052,528 B2
(45) Date of Patent: Jul. 30, 2024

(54) TELEPRESENCE SYSTEM

(71) Applicant: SONY GROUP CORPORATION, Tokyo (JP)

(72) Inventor: Yusuke Sakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 72 days.

(21) Appl. No.: 17/777,944

(22) PCT Filed: Nov. 13, 2020

(86) PCT No.: PCT/JP2020/042400
§ 371 (c)(1),
(2) Date: May 18, 2022

(87) PCT Pub. No.: WO2021/106622
PCT Pub. Date: Jun. 3, 2021

(65) Prior Publication Data
US 2023/0023930 A1    Jan. 26, 2023

(30) Foreign Application Priority Data
Nov. 29, 2019    (JP) .................................. 2019-216095

(51) Int. Cl.
*H04N 7/14* (2006.01)
*G10K 11/162* (2006.01)

(52) U.S. Cl.
CPC ........... *H04N 7/147* (2013.01); *G10K 11/162* (2013.01); *H04N 7/142* (2013.01)

(58) Field of Classification Search
CPC ............................... H04N 7/147; H04N 7/142
See application file for complete search history.

(56) References Cited

U.S. PATENT DOCUMENTS

| | | | |
|---|---|---|---|
| 2014/0267575 A1* | 9/2014 | Eisenberg | H04N 7/152 348/14.09 |
| 2014/0270302 A1 | 9/2014 | Pocino et al. | |
| 2016/0295170 A1* | 10/2016 | White | H04N 21/812 |

FOREIGN PATENT DOCUMENTS

| | | |
|---|---|---|
| CN | 104053109 A | 9/2014 |
| EP | 2779638 A2 | 9/2014 |
| JP | 2000-059981 A | 2/2000 |

(Continued)

OTHER PUBLICATIONS

International Search Report and Written Opinion of PCT Application No. PCT/JP2020/042400, issued on Feb. 2, 2021, 09 pages of ISRWO.

*Primary Examiner* — Amal S Zenati
(74) *Attorney, Agent, or Firm* — CHIP LAW GROUP

(57) ABSTRACT

The present disclosure relates to a telepresence system capable of providing telepresence in a better acoustic environment. The telepresence system includes a network that connects a plurality of bases, and a plurality of telepresence facilities that transmit and receive video images and sound via the network and share the video images and the audio between the respective bases. Each telepresence facility is then entirely covered with a sound shielding portion that acoustically shields the external environment and the internal environment of the telepresence facility from each other. Further, in each of the telepresence facilities, the same sound field as that of another telepresence facility is reproduced in a closed space shielded by the sound shielding portion.

9 Claims, 6 Drawing Sheets

(56) References Cited

FOREIGN PATENT DOCUMENTS

| | | |
|---|---|---|
| JP | 2008-177802 A | 7/2008 |
| JP | 2014-037671 A | 2/2014 |
| JP | 2014-179983 A | 9/2014 |
| JP | 2019-028995 A | 2/2019 |
| WO | 2017/098772 A1 | 6/2017 |
| WO | 2017/098780 A1 | 6/2017 |

* cited by examiner

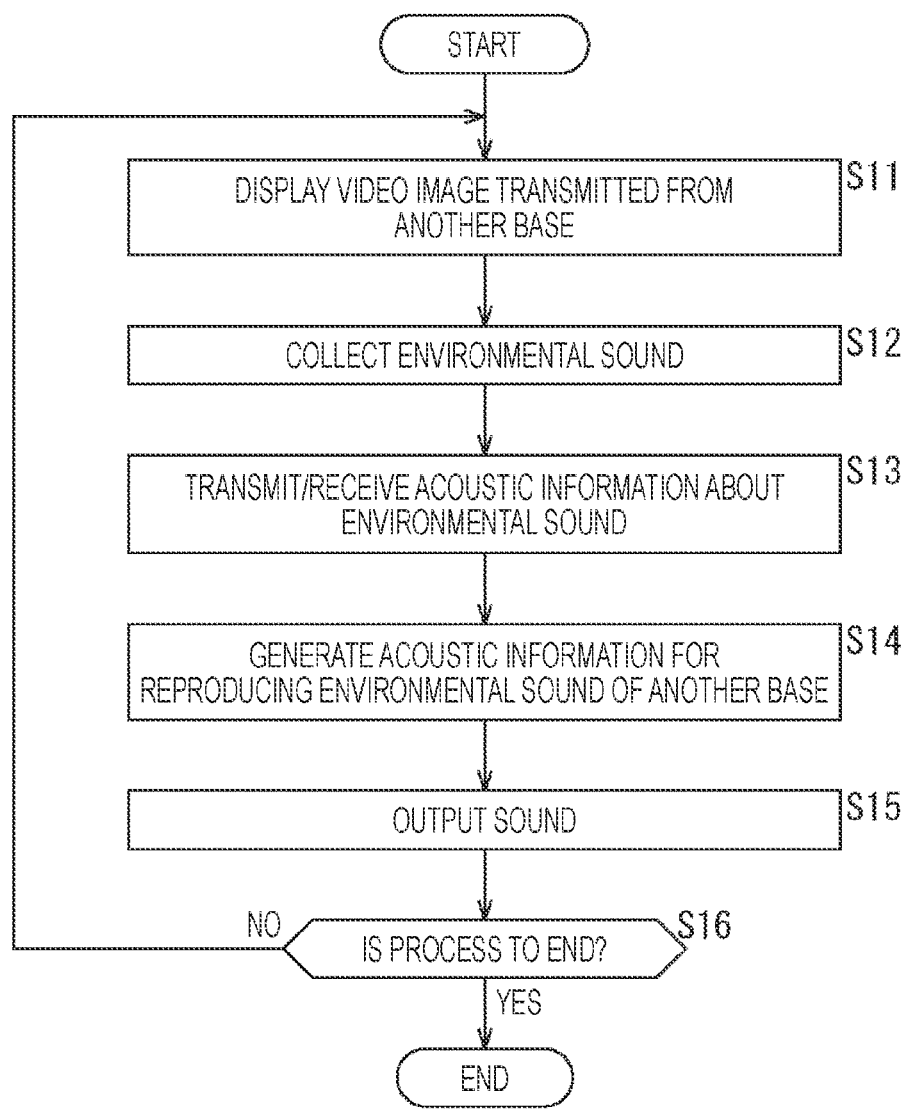

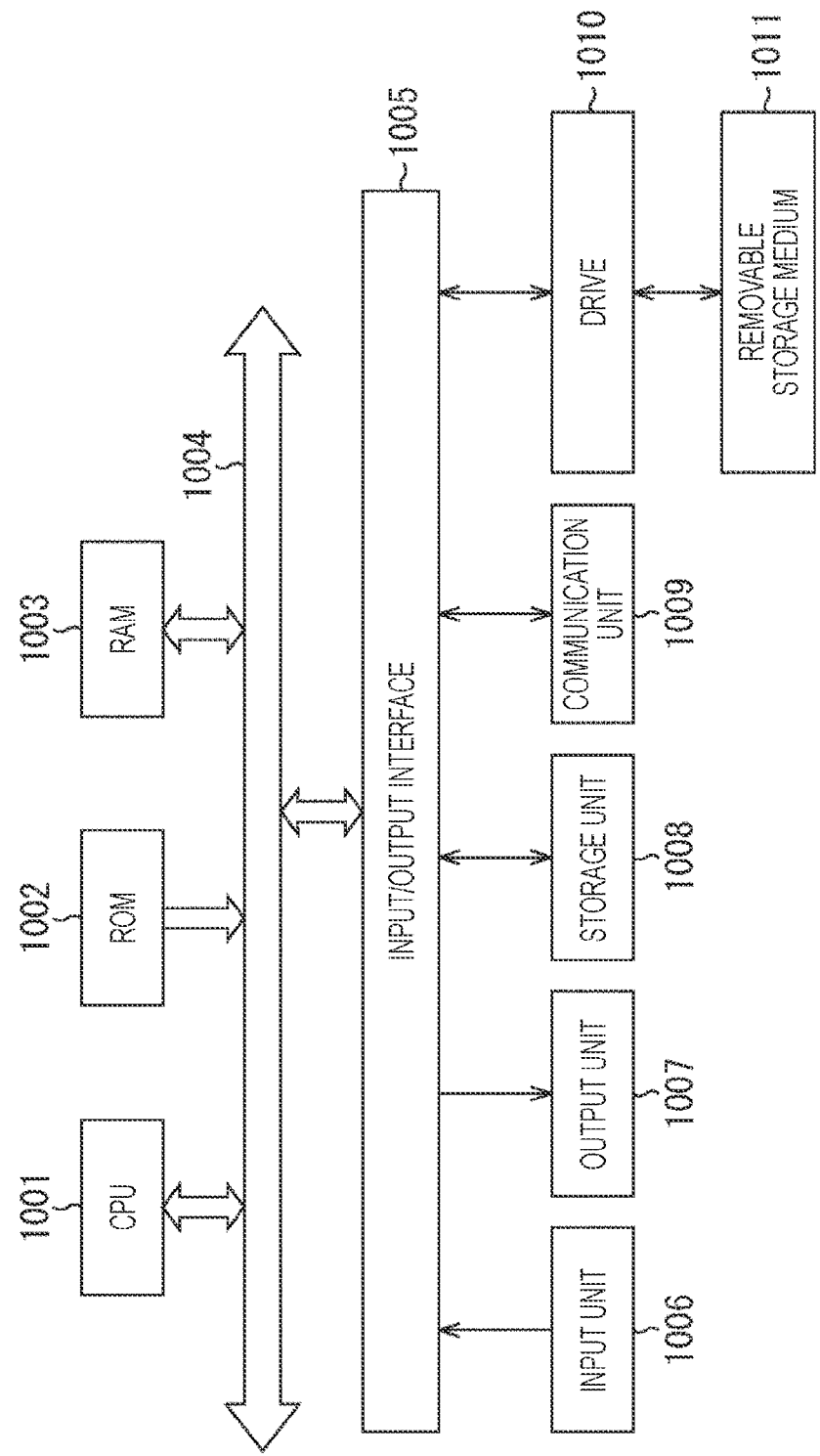

US 12,052,528 B2

TELEPRESENCE SYSTEM

CROSS REFERENCE TO RELATED APPLICATIONS

This application is a U.S. National Phase of International Patent Application No. PCT/JP2020/042400 filed on Nov. 13, 2020, which claims priority benefit of Japanese Patent Application No. JP 2019-216095 filed in the Japan Patent Office on Nov. 29, 2019. Each of the above-referenced applications is hereby incorporated herein by reference in its entirety.

TECHNICAL FIELD

The present disclosure relates to telepresence systems, and more particularly, to a telepresence system that enables an experience of telepresence in a better acoustic environment.

BACKGROUND ART

Telepresence systems have been developed to connect distance spaces to each other by video image, sound, and other information channels, and make users feel as if the places were continuous and each other were actually there.

For example, in a case where a parent and a child live apart from each other, a telepresence system enables them to see their living spaces are continuous via a window or a door. Further, in a case where their living spaces are connected to each other by the telepresence system, each user can live while roughly grasping the state of the other space (such as the state of the child or the state of the parent, for example).

For example, as disclosed in Patent Documents 1 and 2, a suggested telepresence system is capable of producing a distance to the other side of communication by using a three-dimensional expression for spatial connection, and achieving more comfortable communication.

CITATION LIST

Patent Document

Patent Document 1: WO 2017/098772 A
Patent Document 2: WO 2017/098780 A

SUMMARY OF THE INVENTION

Problems to be Solved by the Invention

However, in the telepresence system described above, the environmental sounds in the external environments of the respective spaces differ from one another. Therefore, it is considered difficult to experience telepresence as if the same space were shared in an acoustic environment in which the difference between environmental sounds is recognized.

The present disclosure is made in view of such circumstances, and aims to enable an experience of telepresence in a better acoustic environment.

Solutions to Problems

A telepresence system according to one aspect of the present disclosure includes: a network that connects a plurality of bases; and a plurality of telepresence facilities that transmit and receive a video image and sound via the network, and share the video image and the sound at each base. Each of the telepresence facilities is entirely covered with a sound shielding portion that acoustically shields the external environment and the internal environment of the telepresence facility from each other.

In the one aspect of the present disclosure, a telepresence system includes: a network that connects a plurality of bases; and a plurality of telepresence facilities that transmit and receive a video image and sound via the network, and share the video image and the sound at each base, and each of the telepresence facilities is entirely covered with a sound shielding portion that acoustically shields the external environment and the internal environment of the telepresence facility from each other.

BRIEF DESCRIPTION OF DRAWINGS

FIG. 5 is a flowchart for explaining a telepresence process.

FIG. 6 is a block diagram showing an example configuration of an embodiment of a computer to which the present technology is applied.

MODE FOR CARRYING OUT THE INVENTION

The following is a detailed description of specific embodiments to which the present technology is applied, with reference to the drawings.

<Example Configuration of a Telepresence System>

Figure 1:
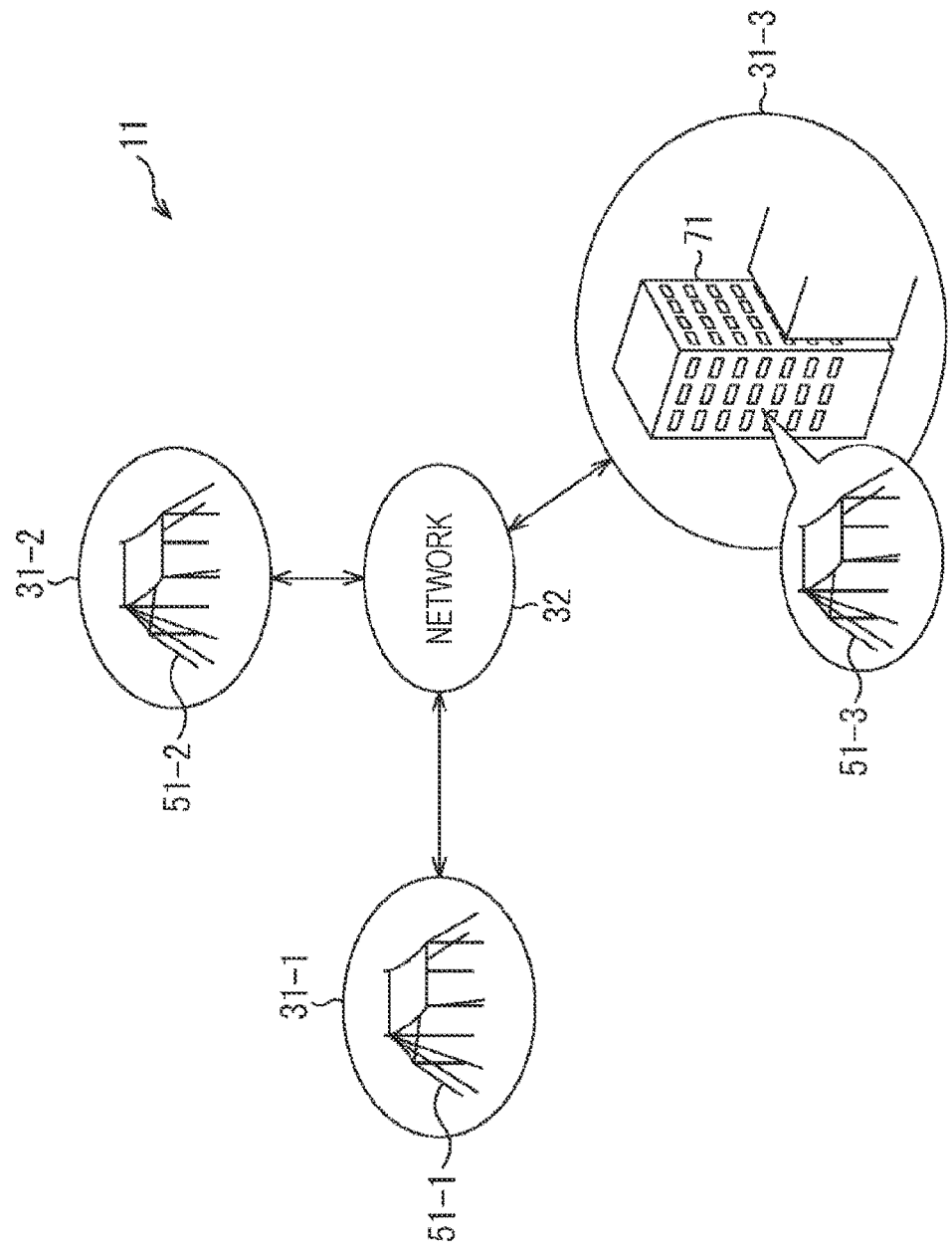
FIG. 1 is a diagram showing an example configuration of an embodiment of a telepresence system to which the present technology is applied.

FIG. 1 is a diagram showing an example configuration of an embodiment of a telepresence system to which the present technology is applied.

The telepresence system 11 shown in FIG. 1 includes three bases 31-1 to 31-3 that are connected via a network 32. Note that the telepresence system 11 may have a configuration in which two bases 31 are connected, or three or more bases 31 are connected.

For example, the bases 31-1 and 31-2 are outdoor environments such as camping sites, and telepresence facilities 51-1 and 51-2 are provided at the respective bases. Meanwhile, the base 31-3 is an indoor environment such as an office building 71, and a telepresence facility 51-3 is provided therein. Note that, in a case where there is no need to distinguish the bases 31-1 to 31-3 from one another and the telepresence facilities 51-1 to 51-3 from one another, they are simply referred to as bases 31 and telepresence facilities 51, and other components are also referred to in a similar manner. Also, a plurality of telepresence facilities 51 may be provided in one base 31.

Further, in the telepresence system 11, telepresence facilities 51 designed in similar manners are provided at a plurality of bases 31, and video images and sound are transmitted and received via the network 32. With this arrangement, the video images and the sound are shared among the respective bases 31, and the users at the respective telepresence facilities 51 can experience telepresence. At this point of time, the telepresence system 11 generates a sound field in which closed spaces divided in the telepresence facilities 51 at different bases 31 overlap one another. With this arrangement, telepresence is realized so that users at different bases 31 can interact with each other as if they were in the same place.

Also, in the telepresence system 11, the telepresence facility 51-3 at the base 31-3 provided in the office building 71 shares the outdoor environment (including video images and the like) of the telepresence facility 51-1 or 51-2 provided at the base 31-1 or 31-2. Accordingly, the user using the telepresence facility 51-3 can experience telepresence as if the user were in an outdoor environment like the base 31-1 or 31-2, for example.

Figure 2:
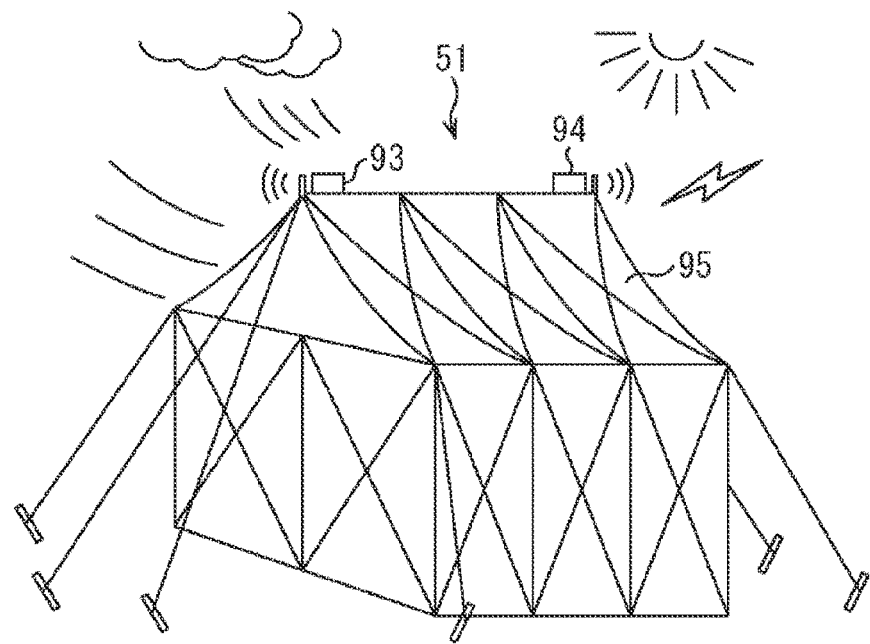
FIG. 2 is a diagram for explaining an exterior and an inner state of a telepresence facility.
Figure 2:
Figure 2:
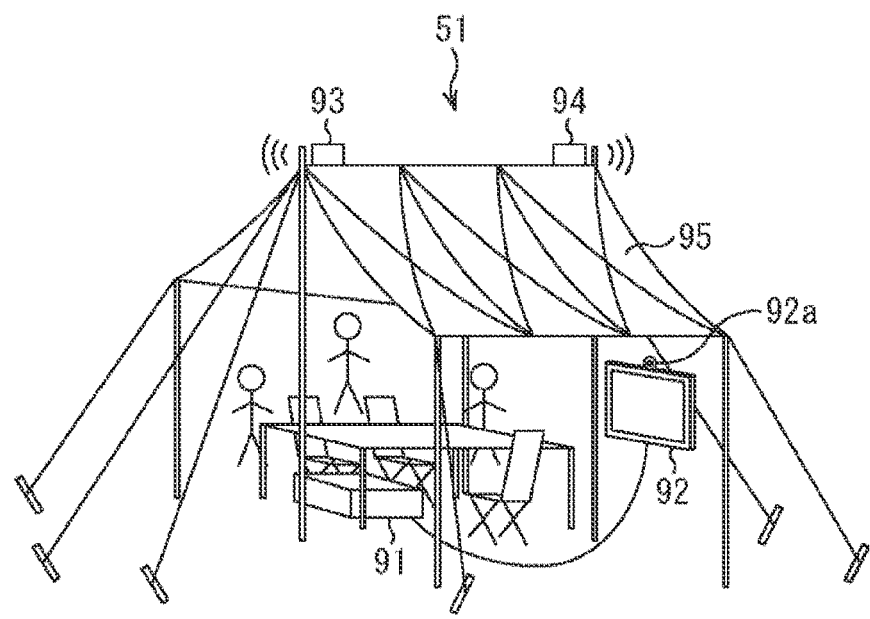

Referring now to FIG. 2, an example configuration of a telepresence facility 51 is described. The upper side in FIG. 2 shows the exterior of the telepresence facility 51, and the lower side in FIG. 2 shows an inner state of the telepresence facility 51.

As shown in FIG. 2, the telepresence facility 51 includes an information processing device 91, a display device 92, an environment sensor 93, an antenna 94, and a fabric-like sound shielding portion 95.

The information processing device 91 includes a personal computer or the like, for example, and controls the respective components constituting the telepresence facility 51, to realize telepresence in the telepresence system 11.

The display device 92 includes a light emitting diode (LCD), an organic electro-luminescence (EL), a projector, or the like, for example, and displays a video image supplied via the information processing device 91. For example, the display device 92 displays a video image that has been transmitted from another base 31 and shows the internal environment or the external environment of another telepresence facility 51. Further, the display device 92 includes an imaging unit 92a that images the internal environment (the front side of the display device 92, for example) or the external environment of the telepresence facility 51, and transmits a video image obtained through the imaging to another base 31 via the information processing device 91.

The environment sensor 93 is a sensor that detects information about environments around the telepresence facility 51. For example, the environment sensor 93 includes at least one sensor among of an illuminance sensor, a wind power sensor, a rainfall sensor, a temperature sensor, an atmospheric pressure sensor, a humidity sensor, and the like, and supplies the sensing results of the respective sensors as information about the environments around the telepresence facility 51, to the information processing device 91.

The antenna 94 is connected to a communication unit 112 (shown in FIG. 4, which will be described later) of the information processing device 91, and transmits and receives radio waves for performing wireless communication via the network 32, for example.

As shown on the upper side in FIG. 2, the fabric-like sound shielding portion 95 is set so as to cover the entire telepresence facility 51 and acoustically shield the external environment and the internal environment of the telepresence facility 51 from each other. For example, the fabric-like sound shielding portion 95 makes the telepresence facility 51 a closed space like a tent (or a movable residential structure or the like.) that is set up outdoors, and cancels acoustic information about the outside with which the telepresence facility 51 is actually in contact.

For example, a fabric that has a sound absorbing effect and is designed so that the telepresence facility 51 becomes a hermetically sealable and movable living space is selected as the fabric-like sound shielding portion 95. Alternatively, a structure in which the telepresence facility 51 can be easily installed outdoors (for example, a structure that is set up with a frame, ropes, and the like, such as a tent) is adopted as the fabric-like sound shielding portion 95. For example, it is preferable to use a so-called dome tent as the telepresence facility 51. A dome tent adopts a structure that is a honeycomb structure formed with an assembly of hexagonal plates, and is frameless having a dome-like shape. Accordingly, such a dome tent is easily set up or moved, and serves as a living space that excels in airtightness, acoustics, and the like.

Also, the fabric-like sound shielding portion 95 preferably contains a component or a substance having a sound absorbing effect in the materials of the tent, or preferably uses a fabric having a weave or thickness that can achieve the greatest sound shielding effect, for example. Further, a sound-shielding coating material may be applied to the inside of the fabric-like sound shielding portion 95 so that sound shielding properties are achieved. For example, it is preferable to use a so-called acoustic metamaterial for the fabric-like sound shielding portion 95. An acoustic metamaterial may be a material having characteristics such that sound is erased with a structure that reflects vibrations of air toward the sound source without disturbing the flow of air, or may be a material having characteristics such that sound waves are freely manipulated by combining helical structures of various patterns that delay the traveling speed of sound waves.

As described above, in the telepresence facility 51, the external environment and the internal environment are acoustically shielded by the fabric-like sound shielding portion 95, so that the differences to be recognized by users between the respective environmental sounds of the external environment can be reduced, for example. Thus, in such an excellent acoustic environment, the users can experience telepresence as if they were sharing the same space.

Figure 3:
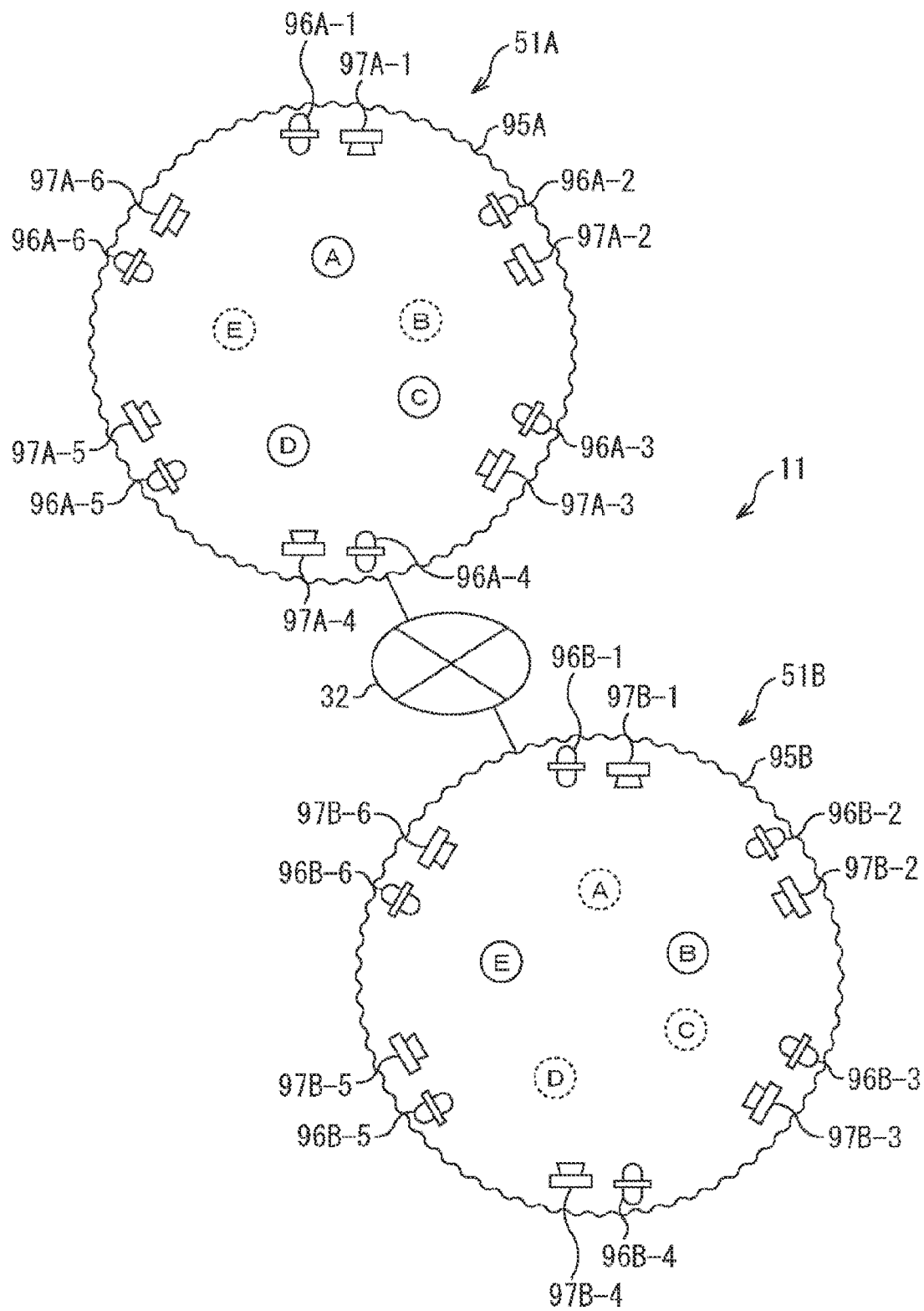
FIG. 3 is a diagram for explaining acoustic telepresence.

As shown in FIG. 3, a telepresence facility 51 further includes sound collection devices 96 and sound output devices 97.

Referring now to a telepresence system 11 shown in FIG. 3, acoustic telepresence using sound collection devices 96 and sound output devices 97 is described. A telepresence facility 51 has a configuration in which a plurality of sound collection devices 96 and a plurality of sound output devices 97 are disposed in an internal environment shielded by a fabric-like sound shielding portion 95.

FIG. 3 shows an example of a telepresence system 11 in which two telepresence facilities 51A and 51B are connected via a network 32. In the telepresence facility 51A, six sound collection devices 96A-1 to 96A-6 and six sound output devices 97A-1 to 97A-6 are disposed in a closed space shielded by a fabric-like sound shielding portion 95A. Likewise, in the telepresence facility 51B, six sound collection devices 96B-1 to 96B-6 and six sound output devices 97B-1 to 97B-6 are disposed in a closed space shielded by a fabric-like sound shielding portion 95B.

Further, the sound collection devices 96A-1 to 96A-6 and the sound output devices 97A-1 to 97A-6, and the sound collection devices 96B-1 to 96B-6 and the sound output devices 97B-1 to 97B-6 are disposed at corresponding positions, respectively. That is, the installation positions of the sound collection devices 96A-1 to 96A-6 and the sound output devices 97A-1 to 97A-6 in the telepresence facility 51A, and the installation positions of the sound collection devices 96B-1 to 96B-6 and the sound output devices 97B-1 to 97B-6 in the telepresence facility 51B are arranged so as to match each other when the closed spaces are superimposed on each other.

For example, in the telepresence facility 51A, the sound collection devices 96A-1 to 96A-6 collect the environmental sound in the closed space shielded by the fabric-like sound shielding portion 95A, and acoustic information about the environmental sound is transmitted to the telepresence facility 51B via the network 32. In the telepresence facility 51B, acoustic information for reproducing the environmental sound in the telepresence facility 51A is then generated from the received acoustic information, and the sound output devices 97B-1 to 97B-6 output the sounds. With this arrangement, in the telepresence facility 51B, the environmental sound in the telepresence facility 51A can be reproduced in the closed space shielded by the fabric-like sound shielding portion 95B. Likewise, the environmental sound in the telepresence facility 51B can be reproduced in the closed space shielded by the fabric-like sound shielding portion 95A.

That is, in the telepresence system 11, the same sound field as that in a similar closed space at a remote location is reproduced, so that users can experience a feeling as if the whole closed space were set up in a different environment. For example, users of the telepresence facility 51-3 of the base 31-3 installed in the office building 71 in FIG. 1 can experience a feeling as if the telepresence facility 51-3 were set up in an outdoor environment like the base 31-1 or 31-2.

Also, the telepresence system 11 can realize acoustic telepresence in which a user in one telepresence facility 51 and a user in the other telepresence facility 51 have a conversation as if they were in the same space.

The example in FIG. 3 illustrates a situation in which five users A to E use the telepresence system 11, the user A, the user C, and the user D are in the telepresence facility 51A, and the user B and the user E are in the telepresence facility 51B. In such a situation, in the telepresence facility 51A, sound is reproduced so that the voices of the users B and E are emitted from the locations corresponding to the locations at which the users B and E are present in the telepresence facility 51B (the locations of the users B and E indicated by dashed lines in the telepresence facility 51A), for example. With this arrangement, the user A, the user C, and the user D can experience telepresence in which the users B and E are not present in the telepresence facility 51A, but conversations can be held as if the users B and E were present in the same space.

Here, to achieve sound proofing or sound shielding by the fabric-like sound shielding portion 95, it is important to devise ideas for design in forming a closed space with the fabric-like sound shielding portion 95, selection of the fabric material to be used for the fabric-like sound shielding portion 95, and the like, without being limited to the example such as the tent shown in FIG. 2, for example.

For example, as an idea for design of the fabric-like sound shielding portion 95, it is preferable to adopt a shape that has a streamline not to receive wind resistance. Also, to achieve wind-resistant strength, a structure that supports the fabric-like sound shielding portion 95 with crossed frames is considered preferable. However, the crossed frames might emit a squeaking sound (a rasping sound) due to the resistance to the wind. Therefore, a structure that supports the fabric-like sound shielding portion 95 with a single frame is also considered. Alternatively, a foldable monocoque structure may be adopted as the fabric-like sound shielding portion 95.

Also, as an idea for selection of the material for the fabric-like sound shielding portion 95, it is preferable to adopt a material obtained by applying a silent coating (such as a coating to be used as the material of a hunting, for example) onto the back surface with a synthetic material having a certain degree of density, and a material having flexibility is preferable. For example, a high pitch sound (a crispy sound) of a certain kind might be emitted from a material having an excessively high density and firmness. Therefore, it is desirable that a material that emits such a sound is not adopted as the fabric-like sound shielding portion 95, or a coating that reduces such a sound is applied.

Further, the material of the fabric-like sound shielding portion 95 may be selected depending on the weather. In the case of sunny weather, a breathable material such as a mesh material or ultra-thin georgette can be used. In the case of rainy weather, a water-repellent or waterproof material can be used as the outer shell.

In addition to the above, the outer surface of the frame that supports the fabric-like sound shielding portion 95 is coated with a sound absorbing material, for example, so that sound shielding properties can be enhanced The sound shielding effect can also be increased with the optional addition of a mesh liner to inside the telepresence facility 51. Further, a ger structure that is used as a house in Mongol and other areas may be adopted as the telepresence facility 51 so that a large amount of sound shielding material can be used, and sound shielding properties can be more effectively enhanced.

<Example Configuration of a Telepresence Facility>

Figure 4:
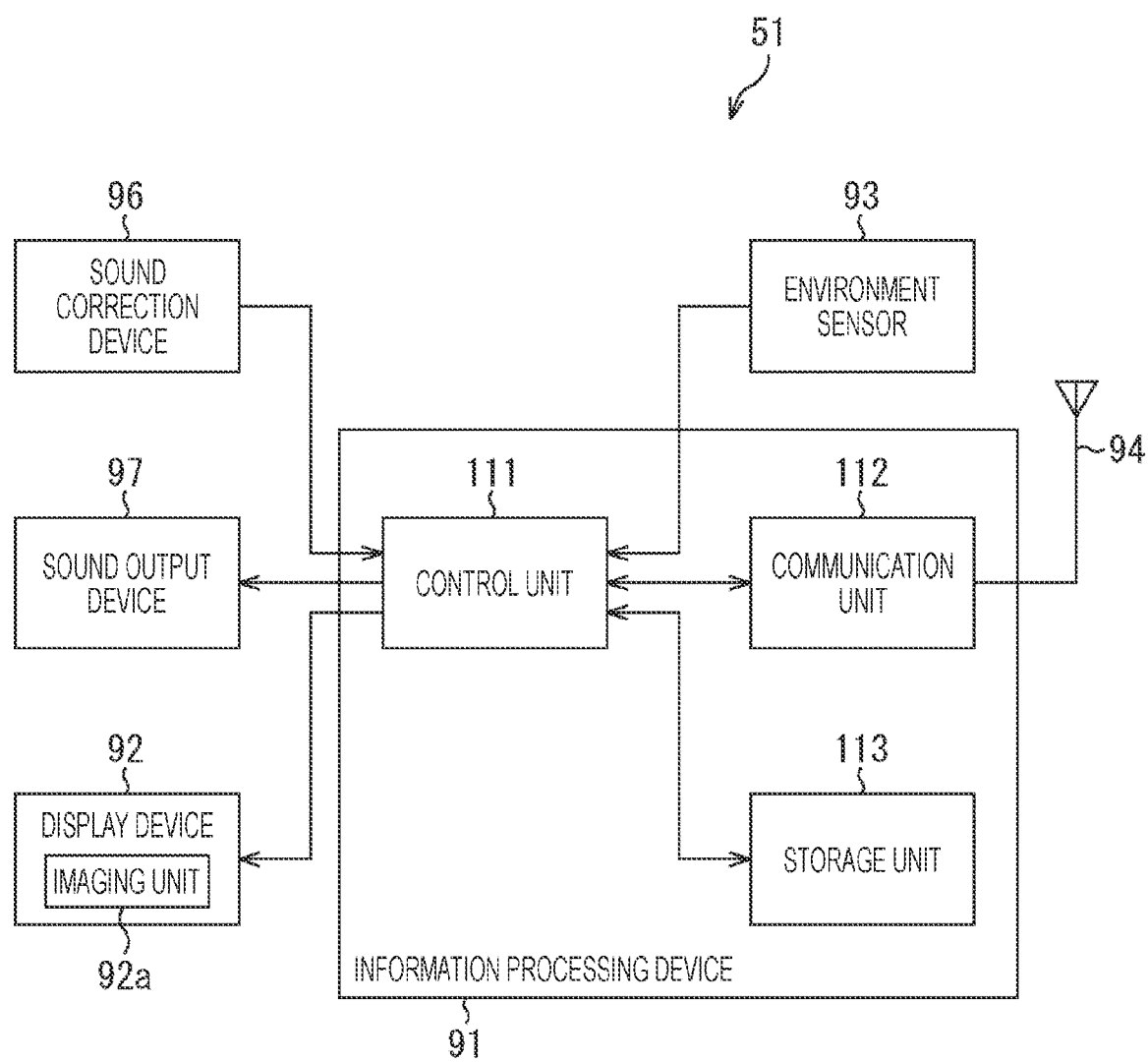
FIG. 4 is a block diagram showing an example configuration of a telepresence facility.

Next, FIG. 4 is a block diagram showing an example configuration of a telepresence facility 51.

As shown in FIG. 4, the telepresence facility 51 includes an information processing device 91, a display device 92, an environment sensor 93, an antenna 94, and a fabric-like sound shielding portion 95. Further, the information processing device 91 includes a control unit 111, a communication unit 112, and a storage unit 113.

The control unit 111 includes a processor, a memory, and the like, and controls the entire operation of the telepresence facility 51, using various kinds of programs and data stored in the storage unit 113 formed with a hard disc drive (HDD), a solid state drive (SSD), or the like. Also, the control unit 111 performs communication through the network 32 via the communication unit 112, and transmits and receives information to and from the telepresence facility 51 at another base 31.

For example, at the telepresence facility 51, when the communication unit 112 receives a video image and acoustic information transmitted from the telepresence facility 51 at another base 31, the control unit 111 supplies the video image to the display device 92 to display the video image. Further, the control unit 111 generates acoustic information for reproducing the environmental sound of the telepresence facility 51 of the other base 31 from the received acoustic information, and supplies the acoustic information to the sound output devices 97 to output the acoustic information.

The control unit 111 then supplies the video image captured by the imaging unit 92a of the display device 92 and the acoustic information about the environmental sound collected by the sound collection devices 96 to the communication unit 112, and causes the communication unit 112 to transmit the video image and the acoustic information to the telepresence facility 51 at the other base 31. The control unit 111 may also perform control based on the information about the environments around the telepresence facility 51 supplied from the environment sensor 93, or transmit the environment information to the telepresence facility 51 of the other base 31.

A telepresence facility 51 is formed as described above, and the external environment and the internal environment are acoustically shielded by the fabric-like sound shielding portion 95 formed with the above-described material, structure, and the like, and the information processing device 91 can analyze the internal and external acoustic conditions and perform information processing such as voice signal processing and context recognition processing. Further, in the telepresence facility 51, removal of sounds in the external environment at a higher level, combining (MIX) with a reproduced sound in an appropriate balance, and the like can be performed through a combination of the material of the acoustic metamaterial forming the fabric-like sound shielding portion 95, a simple driving (characteristic changing) technique, and information processing by the information processing device 91. This enables the telepresence facility 51 to achieve unprecedented closed-space performance through a combination of acoustic material control, voice signal processing, and modes (such as sound shielding/MIX/release), and to provide users with a more novel experience.

<Telepresence Process>

Referring now to a flowchart in FIG. 5, a telepresence process to be performed in a telepresence facility 51 is described. Note that this process is based on the premise that communication between the telepresence facilities 51 to mutually perform the telepresence process is established in advance.

In step S11, the control unit 111 receives a video image transmitted from the telepresence facility 51 at the other base 31 via the communication unit 112, and causes the display device 92 to display the video image. In parallel with that, the control unit 111 transmits the video image captured by the imaging unit 92a to the telepresence facility 51 at the other base 31 via the communication unit 112. With this arrangement, the respective internal environments are shared between the telepresence facilities 51 at the different bases 31 through a video image.

In step S12, the sound collection devices 96 collect the environmental sound in the closed space shielded by the fabric-like sound shielding portion 95, and supplies acoustic information about the environmental sound to the control unit 111.

In step S13, the control unit 111 transmits the acoustic information supplied from the sound collection devices 96 in step S12, to the telepresence facility 51 of the other base 31 through the communication unit 112. In parallel with this, the control unit 111 receives acoustic information transmitted from the telepresence facility 51 of the other base 31 through the communication unit 112.

In step S14, the control unit 111 generates acoustic information for reproducing the environmental sound of the telepresence facility 51 of the other base 31 from the acoustic information received in step S13, and supplies the acoustic information to the sound output devices 97.

In step S15, the sound output devices 97 output sound according to the acoustic information supplied from the control unit 111 in step S14. As a result, the same sound field as that of the telepresence facility 51 at the other base 31 can be reproduced, and acoustic telepresence that provides an experience as if the users in the respective telepresence facilities 51 were present in the same space is realized, as described above with reference to FIG. 3.

In step S16, the control unit 111 determines whether or not a process end instruction has been issued. If any end instruction has not been issued, the process returns to step S11. That is, the processes in steps S11 to S16 are repeated until an end instruction is issued.

If it is determined in step S16 that an end instruction has been issued, the process then comes to an end.

As the sound shielding properties of the closed space shielded by the fabric-like sound shielding portion 95 are enhanced as described above, a telepresence facility 51 can reproduce the environmental sound of the closed space of another telepresence facility 51, without making users aware of the actual sound of the external environment. With this arrangement, the telepresence facility 51 can provide telepresence in which users present at the respective bases 31 can interact as if the closed space shielded by the fabric-like sound shielding portion 95 overlapped with the closed space of the other telepresence facility 51.

Also, as the telepresence facility 51 has high sound shielding properties by virtue of the fabric-like sound shielding portion 95, it is possible to provide telepresence without worrying about the neighborhood even, at hours such as midnight in an outdoor camp site, for example. Further, even in a case where the telepresence facility 51 is used at a time of disaster, the fabric-like sound shielding portion 95 provides high sound shielding properties, and thus, privacy can be protected from the surroundings.

Meanwhile, in a case where a telepresence facility 51 is used as an outdoor office, it is possible to easily secure confidentiality, because the fabric-like sound shielding portion 95 provides excellent sound shielding properties. Further, a large telepresence facility 51 such as a circus tent may be provided so that an event (such as a music festival, for example) in which sound is emitted only in a closed space shielded by the fabric-like sound shielding portion 95 can be held even outdoors where attention needs to be paid not to leak sound to the surrounding areas, for example.

Note that the functions of a telepresence facility 51 could be enhanced, if a thin and lightweight sound absorbing material, a high-performance sound absorbing coating, or the like is developed, or the airtightness of the fabric-like sound shielding portion 95 is ensured. Further, in preparation for an emergency situation in a telepresence facility 51, an escape system that includes a rope to be pulled to open part of the fabric-like sound shielding portion 95 and emit sound for rescue to the outside is provided, for example, and thus, safety can be further enhanced.

<Examples in which Processes are Carried Out by Software>

Meanwhile, the above described series of processes can be performed by hardware, but can also be performed by software. In a case where the series of processes are performed by software, the program that forms the software can be installed in a computer incorporated into special-purpose hardware, or can be installed from a recording medium into a general-purpose computer or the like that can execute various kinds of functions by installing various kinds of programs, for example.

FIG. 6 shows an example configuration of a general-purpose computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005. The input unit 1006 is formed with an input device such as a keyboard or a mouse through which a user inputs an operation command, the output unit 1007 outputs an image of a process operating screen or a processing result to a display device, the storage unit 1008 is formed with a hard disk drive or the like that stores programs and various kinds of data, and the communication unit 1009 is formed with a local area network (LAN) adapter or the like and performs a communication process via a network that is typically the Internet. A drive 1010 is also connected to the input/output interface 1005. The drive 1010 performs data reading and writing on a removable storage medium 1011, such as a magnetic disk (such as a flexible disk), an optical disk (such as a Compact Disc-Read-Only Memory (CD-ROM) or a Digital Versatile Disc (DVD)), a magnetooptical disk (such as Mini Disc (MD)), or a semiconductor memory.

The CPU 1001 performs various processes in accordance with a program that is stored in the ROM 1002, or a program that is read from the removable storage medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) can be recorded on the removable storage medium 1011 as a packaged medium or the like, for example, and be then provided. Alternatively, the program can be provided via a wired or wireless transmission medium, such as a local area network, the Internet, or digital satellite broadcasting.

In the computer, the program can be installed into the storage unit 1008 via the input/output interface 1005 when the removable storage medium 1011 is mounted on the drive 1010. Also, the program can be received by the communication unit 1009 via a wired or wireless transmission medium, and be installed into the storage unit 1008. Alternatively, the program can be installed beforehand into the ROM 1002 or the storage unit 1008.

Note that the program to be executed by the computer may be a program for performing processes in chronological order in accordance with the sequence described in this specification, or may be a program for performing processes in parallel or performing a process when necessary, such as when there is a call.

Note that the CPU 1001 in FIG. 6 achieves the functions of the control unit 111 shown in FIG. 4.

Also, in this specification, a system means an assembly of plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that embodiments of the present disclosure are not limited to the above described embodiments, and various modifications can be made to the embodiments without departing from the scope of the present disclosure.

For example, the present disclosure can be embodied in a cloud computing configuration in which one function is shared among devices via a network, and processing is performed by the plurality of devices cooperating with one another.

Further, the respective steps described with reference to the flowcharts described above can be carried out by one device, or can be shared among a plurality of devices.

Furthermore, in a case where a plurality of processes is included in one step, the plurality of processes included in the one step can be performed by one device, or can be shared among a plurality of devices.

Note that, as long as there is no inconsistency, the plurality of technologies described in this specification can be implemented independently of one another. It is of course also possible to implement a combination of some of the plurality of techniques according to the present technology. For example, part or all of the present technology described in one of the embodiments can be implemented in combination with part or all of the present technology described in another one of the embodiments. Further, part or all of the present technology described above can be implemented in combination with some other technology not described above.

<Example Combinations of Configurations>

Note that the present technology can also be embodied in the configurations described below.

(1)

A telepresence system including:

a network that connects a plurality of bases; and a plurality of telepresence facilities that transmit and receive a video image and sound via the network, and share the video image and the sound at each base, in which each of the telepresence facilities is entirely covered with a sound shielding portion that acoustically shields an external environment and an internal environment of the telepresence facility from each other.

(2)

The telepresence system according to (1), in which each of the telepresence facilities reproduces the same sound field as a sound field of another one of the telepresence facilities, in a closed space shielded by the sound shielding portion.

(3)

The telepresence system according to (2), further including:

for each of the telepresence facilities, a sound collection device that collects an environmental sound in the closed space shielded by the sound shielding portion; and a sound output device that outputs a sound reproducing an environmental sound of the another one of the telepresence facilities.

(4)

The telepresence system according to (3), in which a plurality of the sound collection devices and a plurality of the sound output devices are disposed at corresponding locations in each of the telepresence facilities, and a sound field that is the same in the respective closed spaces is reproduced.

(5)

The telepresence system according to any one of (1) to (4), in which the sound shielding portion is designed such that the telepresence facility is a hermetically sealable and movable living space.

(6)

The telepresence system according to any one of (1) to (5), in which a fabric material having a sound absorbing effect is selected as the sound shielding portion.

(7)

The telepresence system according to any one of (1) to (6), in which a structure with which the telepresence facility can be easily set up outdoors is adopted as the sound shielding portion.

(8)

The telepresence system according to any one of (1) to (7), in which the sound shielding portion is formed with a film whose material containing a component or a substance having a sound absorbing effect.

(9)

The telepresence system according to any one of (1) to (8), in which a fabric having a weave or a thickness with which a sound shielding effect is most achieved is used for the sound shielding portion.

It should be noted that this embodiment is not limited to the above described embodiments, and various modifications may be made to them without departing from the scope of the present disclosure. Furthermore, the advantageous effects described in this specification are merely examples, and the advantageous effects of the technology are not limited to them and may include other effects.

REFERENCE SIGNS LIST

11 Telepresence system
31 Base
32 Network
51 Telepresence facility
71 Office building
91 Information processing device
92 Display device
93 Environment sensor
94 Antenna
95 Fabric-like sound shielding portion
111 Control unit
112 Communication unit
113 Storage unit

The invention claimed is:

1. A telepresence system, comprising:
a plurality of bases;
a network configured to connect the plurality of bases; and
a plurality of telepresence facilities configured to:
  transmit and receive a video image and sound via the network; and
  share the video image and the sound at each base of the plurality of bases; and
a plurality of sound shielding portions corresponding to the plurality of telepresence facilities, wherein
  each of the plurality of sound shielding portions is configured to acoustically shield an external environment and an internal environment of a respective telepresence facility of the plurality of telepresence facilities, and
  each of the plurality of sound shielding portions entirely covers the respective telepresence facility.

2. The telepresence system according to claim 1, wherein each of the plurality of telepresence facilities is configured to reproduce a same sound field as a sound field of another one of the plurality of telepresence facilities, in a closed space shielded by a respective sound shielding portion of the plurality of sound shielding portions.

3. The telepresence system according to claim 2, further comprising:
for each of the plurality of telepresence facilities,
  a sound collection device configured to collect an environmental sound in the closed space shielded by the respective sound shielding portion; and
  a sound output device configured to output a specific sound that reproduces an environmental sound of the another one of the plurality of telepresence facilities.

4. The telepresence system according to claim 3, further comprising a plurality of sound collection devices and a plurality of sound output devices at corresponding locations in each of the plurality of telepresence facilities to reproduce a same sound field in respective closed spaces of the plurality of sound shielding portions, wherein
  the plurality of sound collection devices includes the sound collection device, and
  the plurality of sound output devices includes the sound output device.

5. The telepresence system according to claim 1, wherein each of the plurality of telepresence facilities is a hermetically sealable and movable living space.

6. The telepresence system according to claim 1, wherein each of the plurality of sound shielding portions includes a fabric material having a sound absorbing effect.

7. The telepresence system according to claim 1, wherein each of the plurality of sound shielding portions corresponds to a structure with which the respective telepresence facility of the plurality of telepresence facilities is easily set up outdoors.

8. The telepresence system according to claim 1, wherein each of the plurality of sound shielding portions includes a film whose material contains a component or a substance having a sound absorbing effect.

9. The telepresence system according to claim 1, wherein each of the plurality of sound shielding portions includes a fabric having a weave or a thickness.

* * * * *